United States Patent
Vasilyev

(10) Patent No.: US 10,886,690 B2
(45) Date of Patent: Jan. 5, 2021

(54) OPTICAL FREQUENCY COMB GENERATOR WITH CARRIER ENVELOPE OFFSET FREQUENCY DETECTION

(71) Applicant: IPG PHOTONICS CORPORATION, Oxford, MA (US)

(72) Inventor: Sergey Vasilyev, Oxford, MA (US)

(73) Assignee: IPG PHOTONICS CORPORATION, Oxford, MA (US)

(*) Notice: Subject to any disclaimer, the term of this patent is extended or adjusted under 35 U.S.C. 154(b) by 0 days.

(21) Appl. No.: 16/474,391

(22) PCT Filed: Jan. 5, 2018

(86) PCT No.: PCT/US2018/012559
§ 371 (c)(1),
(2) Date: Jun. 27, 2019

(87) PCT Pub. No.: WO2018/129297
PCT Pub. Date: Jul. 12, 2018

(65) Prior Publication Data
US 2019/0356103 A1 Nov. 21, 2019

Related U.S. Application Data

(60) Provisional application No. 62/442,629, filed on Jan. 5, 2017.

(51) Int. Cl.
| H01S 3/00 | (2006.01) |
| G02F 3/02 | (2006.01) |
| H01S 3/109 | (2006.01) |
| H01S 3/11 | (2006.01) |

(52) U.S. Cl.
CPC ............ H01S 3/0092 (2013.01); G02F 3/026 (2013.01); H01S 3/1095 (2013.01); H01S 3/1112 (2013.01); G02F 2203/56 (2013.01)

(58) Field of Classification Search
CPC .... H01S 3/0092; H01S 3/1095; H01S 3/1112; G02F 2203/56
See application file for complete search history.

(56) References Cited

U.S. PATENT DOCUMENTS

| 2011/0274127 A1* | 11/2011 | Masuda | H01S 3/0014 372/25 |
| 2015/0249317 A1* | 9/2015 | Hartl | H01S 3/06716 372/6 |
| 2016/0094010 A1* | 3/2016 | Hartl | H01S 3/1112 372/6 |
| 2020/0076149 A1* | 3/2020 | Papp | H01S 3/0057 |

* cited by examiner

Primary Examiner — Dinh T Le
(74) Attorney, Agent, or Firm — Yuri Kateshov, Esq.; Caroline J. Roush, Esq.

(57) ABSTRACT

The present invention provides systems and methods for optical frequency comb generation with self-generated optical harmonics in mode-locked lasers for detecting the carrier envelope offset frequency. The mode-locked laser outputs an optical frequency comb and a harmonic output. The harmonic output provides an optical heterodyne resulting in a detectable beat note. A carrier envelope offset frequency detector detects the beat note and generates an optical frequency comb signal. The signal can be used to stabilize the optical frequency comb output.

12 Claims, 8 Drawing Sheets

FREQUENCY COMB IN TIME DOMAIN REPRESENTATION

FREQUENCY COMB IN FREQUENCY DOMAIN REPRESENTATION

KNOWN ART

KNOWN ART

OPTICAL FREQUENCY COMB GENERATOR WITH CARRIER ENVELOPE OFFSET FREQUENCY DETECTION

BACKGROUND OF THE DISCLOSURE

Field of the Disclosure

The disclosure relates to novel optical frequency comb generators with carrier envelope offset frequency detection. More particularly, embodiments may simultaneously provide optical frequency comb generation in a mode-locked laser regime, as well as optical harmonics using polycrystalline laser materials that have high non-linear characteristics. Nonlinear frequency conversion crystals are eliminated resulting in simplified carrier envelope offset frequency detection.

Background of the Disclosure

The recent advent of an optical frequency comb has revolutionized the fields of spectroscopy, metrology, timekeeping, [see for example T. W. Hänsch, "Nobel lecture: Passion for precision," Rev. Mod. Phys. 78, 1297 (2006), and J. L, Hall, "Nobel lecture: Defining and measuring optical frequencies," Rev. Mod. Phys. 78, 1279 (2006)]. Presently, the vast majority of optical frequency combs are based on mode-locked femtosecond lasers. The mode-locked femtosecond laser (hereafter "fs oscillator") output consists of a periodic train of short optical pulses. For the purposes of this disclosure, the fundamental fs oscillator output frequency may be referred to as f, frequency doubled output 2f, tripled 3f etc.

As illustrated in FIG. 1A, a train of optical pulses emitted by a mode-locked femtosecond laser: a carrier optical wave (solid line) is modulated by a periodic pulse envelope (dashed line) at pulse repetition frequency $f_{rep}$. Also shown is a pulse-to-pulse carrier envelope phase slip of $\Delta\varphi_{CE}=\pi/2$ in this example. Referring to FIG. 1B the equivalent frequency domain representation (the Fourier transform of the signal of FIG. 1A) shows a comb of equally spaced spectral components with a common offset of the comb $f_{CEO}=f_{rep} \times (\Delta\varphi_{CE}/2\pi)$. The time-averaged frequency domain output of a fs oscillator is described by the simple formula, $f_n = n \times f_{rep} + f_{CEO}$, where n is the integral mode index.

The optical output of a fs oscillator is classified as a frequency comb if the parameters $f_{rep}$, and $f_{CEO}$ are measured and controlled. The techniques for measurement and control of $f_{rep}$ are now well developed. On the other hand, it was only in 1999 that the reliable methods for the measurement and control of the $f_{CEO}$ of fs oscillators were proposed. Generally, these techniques are referred to as nonlinear interferometry, as they are based on heterodyning of the fundamental comb, f, either with its second harmonic 2f, (f–2f interferometry) or with difference frequency generation (0–f interferometry), or heterodyning of two adjacent optical harmonics (e.g. 2f–3f interferometry).

The key prerequisites for the measurement of $f_{CEO}$ are: (i) Spectral overlap of the two combs, (ii) spatial overlap of the two combs, and (iii) temporal overlap of the two combs. The generic scheme of the nonlinear interferometer fulfills these prerequisites for $f_{CEO}$ detection. The prerequisite (i) is fulfilled either by the use of a fs oscillator with a broad spectrum fundamental frequency comb or by the use of an additional device for spectral broadening (SB) of the fundamental frequency comb (e,g, a specially designed optical fiber).

Spectral overlap in f–2f interferometry is illustrated in FIG. 2. The upper graph shows a fundamental frequency comb including spectral components $f_n = f_{CEO} + nf_{rep}$ and its octave $f_{2n} = f_{CEO} + 2nf_{rep}$. The lower graph shows a frequency doubled comb including spectral components $2f_n = 2f_{CEO} + 2nf_{rep}$. Measurable $f_{CEO}$ is shown as the increment between the octave frequency and doubled frequency fulfilling prerequisite (i) where the spectra overlap. Similar considerations can be made for other cases of nonlinear interferometry.

A nonlinear interferometer is illustrated in FIG. 3, where fs oscillator generates a fundamental comb which may be broadened using SB. The fundamental comb is then divided in two parts with a beamsplitter BS and sent through two legs of the nonlinear interferometer. Each leg can contain a device for nonlinear conversion of the fundamental comb f to its n-th optical harmonic, of in one leg and an adjacent harmonic (n–1) f in the other leg. In the simplest case of f–2f interferometry, one nonlinear converter to the second harmonic is sufficient. The two legs of the interferometer are then re-combined using a second beamsplitter BS and the prerequisite (ii) of the spatial overlap is fulfilled. The prerequisite (iii) of the temporal overlap is fulfilled by the use of an optical delay OD as required to adjust the relative optical path length difference to zero.

With the three prerequisites met, the two combs are superimposed and the two superimposed combs result in an amplitude modulation that is detectable as a beat note with an appropriate photodetector PD, [see H. R. Telle, G. Steinmeyer, A. E. Dunlop, J. Stenger, D. H. Sutter, and U. Keller, "Carrier-envelope offset phase control: A novel concept for absolute optical frequency measurement and ultrashort pulse generation," Appl. Phys. B 69, 327 (1999)]. An optional spectral filter F can be employed to improve quality of the beat note.

The techniques for $f_{CEO}$ detection via nonlinear interferometry are now well established, [as reviewed in B. Borchers, "Pushing Frontiers in Carrier-Envelope Phase Stabilization of Ultrashort Laser Pulses", Ph.D thesis Humboldt-Universität zu Berlin (2014) URL http://edoc.hu-berlin.de/dissertationen/borchers-bastian-2014-10-17/PDF/borehers.pdf and S. A. Diddams, "The evolving optical frequency comb [Invited]," J. Opt. Soc. Am. B, 27(11), B51 (2010)]. The interferometric setups for $f_{CEO}$ detection generally share, to a greater or lesser extent, the common drawbacks: sensitivity to external noise (the interferometer must be shielded against air streaks, acoustic noise, mechanical vibrations, thermal drifts, etc.), sensitivity to optical alignment (the interferometer may require maintenance), optical power consumption (the interferometer consumes a significant fraction of precious output of the fs oscillator), high complexity, high cost, and bulkiness of the interferometric setup.

Attempts to improve on the multi-leg interferometer include inline frequency conversion with a nonlinear crystal resulting in coaxial harmonic components, difference frequency generation and inline difference frequency generation, all with nonlinear crystals. All of these configurations, both the multi-leg and inline configurations, use at least one extra cavity nonlinear conversion optical element, and when needed, spectral broadening of the fundamental comb before frequency conversion.

Thus, many important variants of the optical frequency combs remain confined in the laboratories and hence have limited use in real-life applications.

SUMMARY OF THE DISCLOSURE

The present invention provides optical frequency comb generation with a mode-locked laser and a carrier envelope offset frequency detector. The mode-locked laser oscillates within a fundamental frequency spectrum and simultaneously generates an optical frequency comb output and a heterodyne output that includes spectral components from auxiliary optical frequency combs. The auxiliary combs include a harmonic of the fundamental optical frequency comb. A carrier envelope offset frequency detector detects the optical heterodyne and generates a signal corresponding to the carrier envelope offset frequency.

In at least one embodiment, the carrier envelope offset frequency detector detects a beat note frequency that corresponds to the carrier envelope offset frequency and provides a signal to stabilize the optical frequency comb output. Spectral overlap of auxiliary optical frequency combs may be provided with a spectral broadening element, and spectral filtering may be provided with a filter element.

In at least one embodiment, the mode-locked laser utilizes a pump source and a femtosecond (fs) oscillator, and the laser medium is a non-linear laser medium that generates an optical frequency comb output and simultaneously self-generates at least one optical harmonic. The fs oscillator may be a mid-IR Kerr-lens mode-locked fs oscillator utilizing TM:II-VI type laser material with high second and third order nonlinearity and a polycrystalline structure. The TM:II-VI type laser material may provide three-wave mixing via a random quasiphase matching process. The fs oscillator may include a resonator cavity tailored for increased output at one or more optical harmonic.

The present invention also provides an optical frequency comb method in a mode-locked laser with an optical frequency comb output and a heterodyne output by simultaneously generating an optical frequency comb output and a heterodyne output with a mode-locked laser, detecting a beat note between spectral components of auxiliary optical frequency combs in the heterodyne output, and generating a signal corresponding to the carrier envelope offset frequency based on the detected beat note.

The present invention yet further provides a method of detecting a carrier envelope offset frequency in a Kerr lens mode-locked mid-IR polycrystalline Cr:ZnS oscillator based laser system with a self-generating harmonic output by simultaneously generating a fundamental optical frequency comb output and one or more optical harmonics directly in the Cr:ZnS material, with any one of these outputs, either the fundamental output or any of the optical harmonic outputs being considered a spectral component, detecting a heterodyne beat note between first and second spectral components in the auxiliary optical frequency combs, and generating a signal corresponding to the carrier envelope offset frequency based on the detected beat note. The rationale for selecting any of the two outputs could include the strength of the signal as well as the availability of sensors for any such output. So, typically one might select the fundamental output and a harmonic output, the second harmonic being preferable due to signal strength, but one of skill in the art may also to select any two distinct harmonic outputs, but the second and third being preferable due to their signal strength.

BRIEF DESCRIPTION OF THE DRAWINGS

The above and other aspects, features and advantages of the disclosure will become more readily apparent with the aid of the following drawings, in which.

SPECIFIC DESCRIPTION

Figure 1:
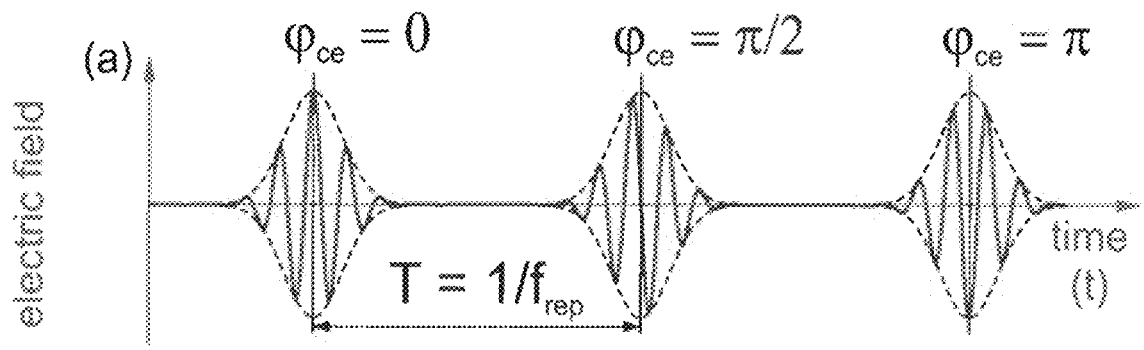
FIG. 1A provides a mode-locked pulse train sequence.
FIG. 1B provides a mode-locked pulse train spectrum.
Figure 1:
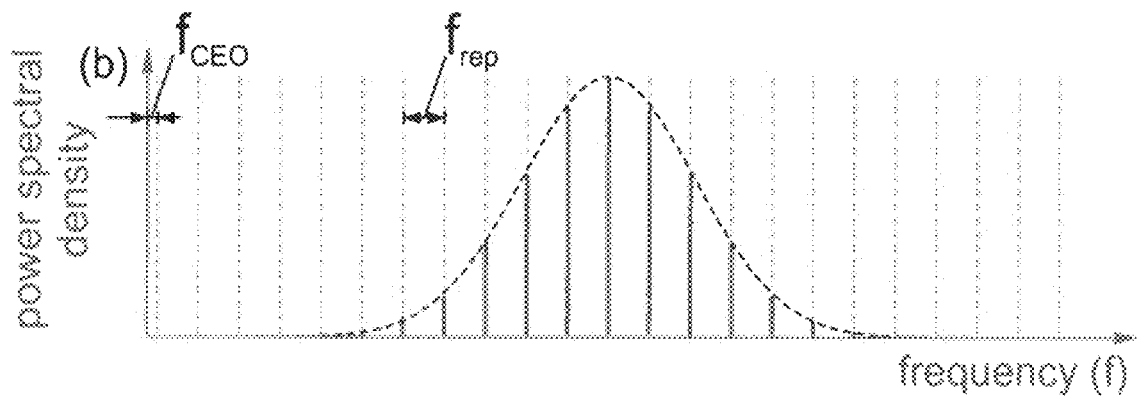
Figure 2:
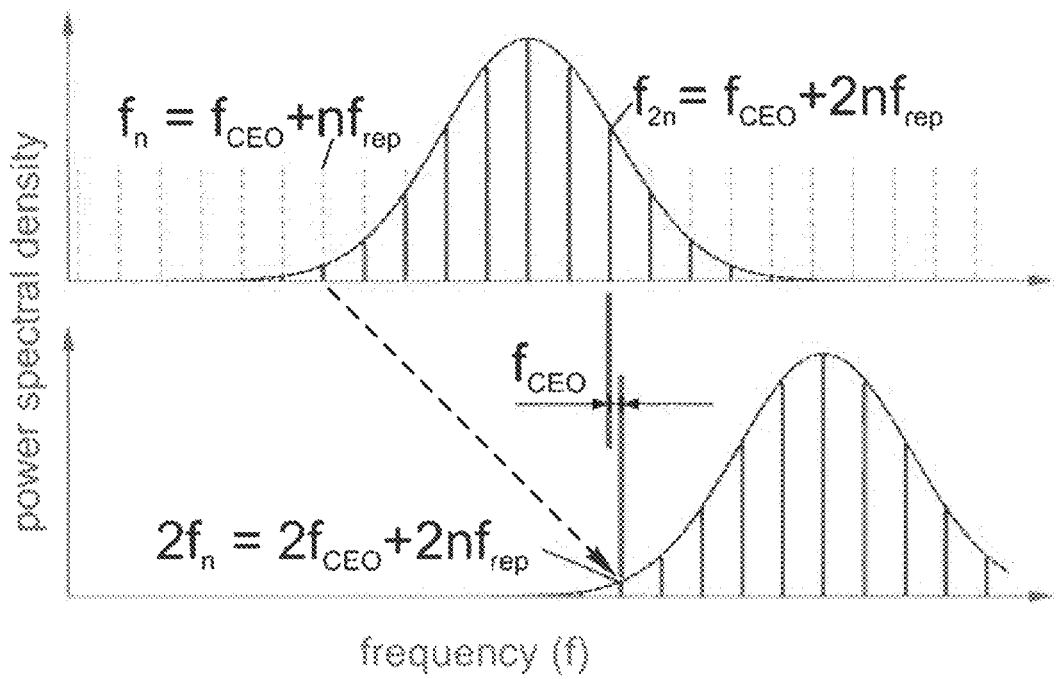
FIG. 2 provides a spectral overlap of octave and frequency doubled spectra.
Figure 3:
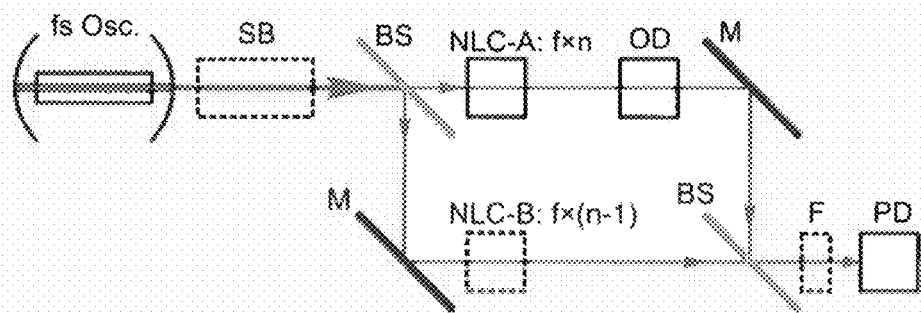
FIG. 3 provides a schematic of a nonlinear interferometer.

Reference will now be made in detail to embodiments of the invention. Wherever possible, same or similar reference numerals or letters are used in the drawings and the description to refer to the same or like parts or steps. The drawings are in simplified form and are not to precise scale. For purposes of convenience and clarity only, directional (up/down, etc.) or motional (forward/back, etc.) terms may be used with respect to the drawings. The term "couple" and similar terms do not necessarily denote direct and immediate connections, but also include connections through intermediate elements or devices.

Fs oscillators based on transition-metal-doped II-VI semiconductors (TM:II-VI) allow fs optical pulses to be obtained directly in important mid-IR spectral range, [S. Mirov, V. Fedorov, D. Martyshkin, I. Moskalev, M. Mirov, S. Vasilyev, "Progress in mid-IR lasers based on Cr and Fe doped II-VI chalcogenides", IEEE J. Sel. Topics Quantum Electron., 21(1), 1601719 (2015), "MIROV" and I. T. Sorokina and E. Sorokin, "Femntosecond Cr2+-based lasers", IEEE J. Sel. Topics Quantum Electron., 21(1), 1601519 (2015)], thus avoiding the need for complex and bulky setups for frequency down-conversion of standard near-IR fs oscillators. Furthermore, very recent progress in polycrystalline $Cr^{2+}$:ZnS and $Cr^{2+}$:ZnSe Kerr-lens mode-locked laser technology has resulted in significant improvements in the output parameters of mid-IR fs oscillators in terms of average power (2 W) (MIROV), pulse energy (24 nJ), [S. Vasilyev, M. Mirov, and V. Gapontsev, "Mid-IR Kerr-lens mode-locked polycrystalline Cr2+:ZnS laser with 0.5 MW peak power" in Advanced Solid State Lasers, OSA Technical Digest (online) (Optical Society of America, 2015), paper AW4A.3] and pulse duration (≤29 fs) [S. Vasilyev, I. Moskalev, M. Mirov, S. Mirov, and V. Gapontsev, "Three optical cycle mid-IR Kerr-lens mode-locked polycrystalline Cr2+:ZnS laser" submitted to Opt. Lett. (2015)].

The development of optical frequency combs, which are based on mid-IR fs oscillators, is of great importance for a number of applications related to spectroscopy and sensing in so-called molecular fingerprint region. The mid-IR frequency combs are also important in the applications related to high-field physics and nonlinear optics: atto-science, high harmonic generation, particle acceleration, etc.

The detection and control of pulse repetition frequency $f_{rep}$ of a fs oscillator based on TM:II-VI materials is rather straightforward, [see, e.g. MIROV]. The detection of the carrier envelope offset frequency $f_{CEO}$ of a TM:II-VI fs oscillator can be implemented via nonlinear interferometry, as described above, and the detected $f_{CEO}$ can then be used to stabilize the optical frequency comb, for example using a phased lock loop. However, simplified and improved mid-IR frequency combs that provide stability, affordability, and small size are desirable for widespread use, particularly when more environmentally sensitive and complex interferometer systems are limited to quiet lab environments.

With simple and stable $f_{CEO}$ detection, aspects of the present invention provide for the detection of the carrier envelope offset frequency, $f_{CEO}$, of a mode-locked laser based optical frequency comb, for example, a TM:II-VI fs oscillator. This $f_{CEO}$ detection avoids the use of a nonlinear interferometer and attendant extracavity nonlinear frequency conversion, and hence greatly improves the robustness of the mid-IR frequency comb.

The combination of parameters of polycrystalline TM:II-VI laser media, [see S. Vasilyev, I. Moskalev, M. Mirov, V. Smolski, S. Mirov, V. Gapontsev, "Mid-IR Kerr-lens mode-locked polycrystalline Cr:ZnS and Cr:ZnSe lasers with intracavity frequency conversion via random quasi-phase-matching," Proc. SPIE 9731, 97310E (2016), "VASILYEV" for detailed review], namely, superb ultrafast laser capabilities, high second and third order nonlinearity, and polycrystalline structure, enables three-wave mixing of fs optical pulses via random quasi-phase-matching (RQPM) process. As a result, an important distinctive feature of fs oscillators based on polycrystalline TM:II-VI is the generation of optical harmonics, which occurs directly in the laser gain medium via the RQPM process. Thus, in contrast to using extracavity nonlinear optical elements generation to generate optical harmonics for use in $f_{CEO}$ detection, with RQPM, the laser can self-generate frequency optical harmonics inside the laser resonator cavity without adding any additional nonlinear optical elements.

Figure 4A:
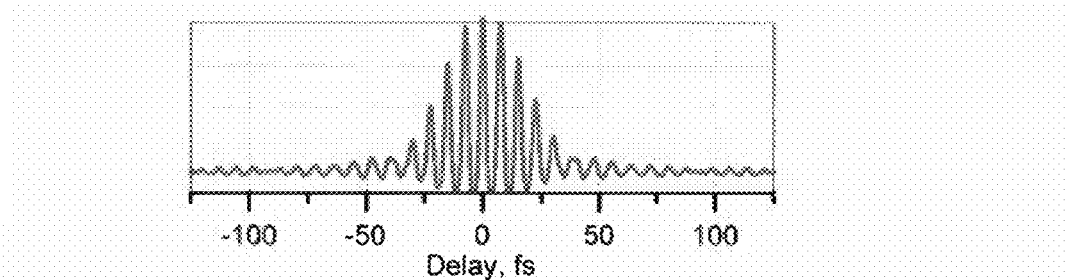
FIG. 4A provides the autocorrelation of output pulses.
Figure 4B:
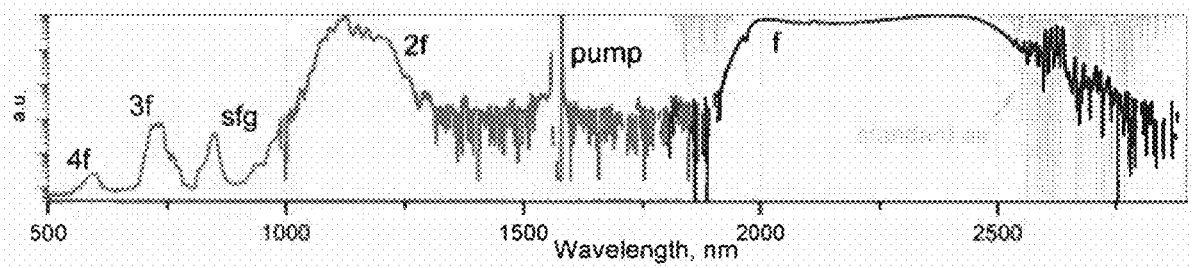
FIG. 4B provides measured spectra of output pulses.
Figure 4C:
FIG. 4C provides an image laser material grain.
Figure 4D:
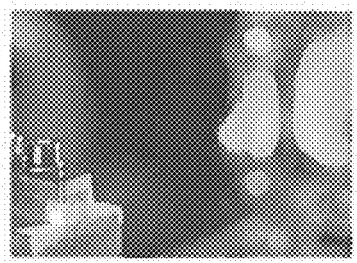
FIG. 4D provides an image of laser output.
Figure 4E:
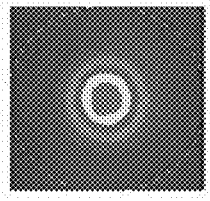
FIG. 4E provides a measured laser beam profile.

Referring now to FIGS. 4A-4E, various parameters of an operational Kerr-lens mode-locked polycrystalline Cr:ZnS oscillator at $f_{rep}$=84 MHz repetition rate are shown. FIG. 4A shows autocorrelation, FIG. 4B a typical spectrum of pulses, FIG. 4C microstructure of polycrystalline gain element, FIG. 4D a photo of the gain element of mode-locked laser, and FIG. 4E an output beam profile. The spectrum FIG. 4B is presented in logarithmic scale including spectra attributed to f, the fundamental mid-IR band with 0.5 W power, 2f, the second harmonic with 0.1 W power, 3f, the third harmonic, 4f the fourth harmonic, sfg, sum frequency generation between fs mid IR pulses and cw pump radiation, and residual pump. Obtained power of second harmonic is about 0.1-0.3 W at $f_{rep}$≈100 MHz repetition rates and about 1-10 mW at high $f_{rep}$≈1 GHz repetition rates. Optical power of third and fourth harmonics is sufficiently high for detection by off-the-shelf photodiodes [(MIROV), S. Vasilyev, I. Moskalev, M. Mirov, S. Mirov, and V. Gapontsev, "Three optical cycle mid-IR Kerr-lens mode-locked polycrystalline Cr2+:ZnS laser" Opt. Lett. 40(21), 5054-5057 (2015)]. In this example laser, the fourth-harmonic emission is sufficiently strong to be clearly visible in the visible spectrum shown in FIG. 4D [see (VASILYEV), for details].

Figure 5:
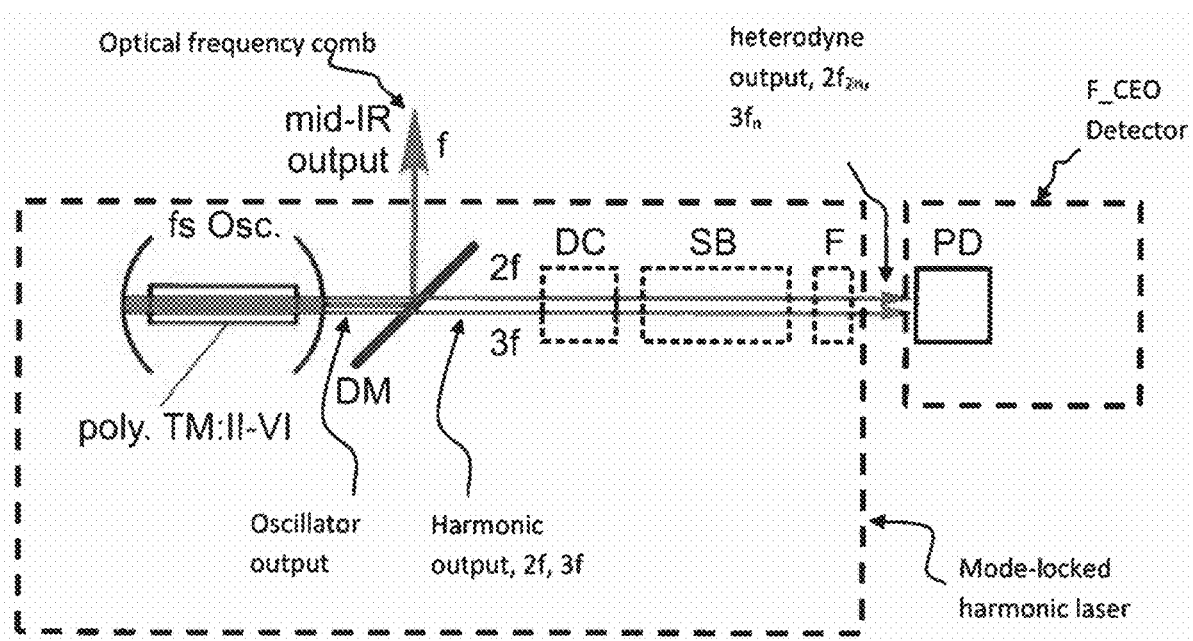
FIG. 5 provides a schematic representation of $f_{CEO}$ detection.

FIG. 5 shows aspects of $f_{CEO}$ detection in a mode-locked laser based on polycrystalline TM:II-VI laser gain material. In at least one embodiment, first and second auxiliary optical frequency combs are second and third optical harmonics 2f and 3f that are generated directly in the gain medium, coupled out of the fs oscillator as part of the oscillator output, and then separated from the fundamental frequency comb f by a dichroic mirror DM. There are two output optical paths exiting the DM, the optical frequency comb output (e.g. the fundamental frequency comb f) and the harmonic output (e.g. f2 and f3). When there is partial spectral overlap of 2f and 3f in the harmonic output, respective spectral components $2f_{2n}$ and $3f_n$ comprise first and second wavelengths A and B in an optical heterodyne output. The optical heterodyne generates a beat note and the beat note frequency equals the carrier envelop offset frequency. This beat note is then detected by the carrier envelope offset frequency detector, and in response to the beat note, the carrier envelope offset frequency detector generates a signal corresponding to the $f_{CEO}$. In this way, $f_{CEO}$ is detected without using extracavity nonlinear elements, frequency conversion crystals, or conventional nonlinear interferometry. Optionally, a combination of lenses, mirrors, etc., can be used for collimation, steering, focusing of the laser beams on a photodetector PD.

While the optical heterodyne requires at least 2 laser wavelengths (e.g. spectral components $2_{f2n}$ and $3f_n$) to generate the beat note, it is to be understood that the invention is not limited to 2 wavelengths. Since all overlapping spectral components generate the same beat note, the heterodyne output may include many spectral components from the overlap of 2f and 3f. While second and third optical harmonics are used in this example, any combination of self-generated wavelengths, including the fundamental wavelength, suitable for producing a beat note is considered to be within the scope of the invention.

Optical components are to be selected according to optical harmonics used. For example, if the fundamental frequency comb is used with a second optical harmonic to generate the optical heterodyne, DM may be eliminated or replaced with a partially reflective mirror. Likewise, different configurations of a fs oscillator may be used with multiple output couplers, for example to generate a fundamental frequency comb output and one or more harmonic outputs directly from the fs oscillator.

In a Kerr-lens mode-locked polycrystalline Cr:ZnS oscillator, it is expected that control of the microstructure of the polycrystalline gain element (i.e. average grain size) will selectively enhance a particular optical harmonic (e.g. 2f).

Design of the fs oscillator may enhance heterodyne beating and improve $f_{CEO}$ detection. The spectral overlap between harmonic components may be provided in the oscillator with a sufficiently broad optical spectrum. Higher frequency optical harmonics with spectra wider than 2f (e.g. 3f, 4f) may be used as auxiliary optical frequency combs to provide spectral overlap. However, spectral broadening in polycrystalline Cr2+:ZnS/ZnSe/CdSe may not be sufficient for generation of sufficiently broad continua for selected harmonics to spectrally overlap. Spectral broadening can be used to provide or increase the spectral overlap and fulfill the spectral overlap requirement with the use of an additional spectral broadening device SB (nonlinear fiber, nonlinear waveguide, bulk material, etc.). SB is installed between fs oscillator and PD and provides spectrally superimposed optical frequency combs.

A SB device may be a length of photonic crystal (PC) fiber with suitable nonlinear optical properties. The PC material is selected with transmission bandwidth according to the harmonic frequency spectrum (or spectra) to be broadened and preferably with a zero dispersion wavelength corresponding to the center of the spectrum. PC fiber materials include fused silica, ZBLAN, silicon nitride, and chalcogenide. U.S. Pat. No. 9,362,707 describes a ZBLAN PC fiber used to generate a supercontinuum, and for use with Ti:Sapphire lasers, a supercontinuum kit Model SCG-800 is available from Newport Corporation of Irvine Calif. Nonlinear waveguides may be short straight waveguides, for example a 10 mm long silicon nitride waveguide is described by A. Johnson in Vol. 41, No. 12/Jun. 15, 2016 Optics Letters.

It is expected that parameters of existing current PC designs and nonlinear waveguides can be modeled with multiphysics software such as COMSOL and predictably adapted for use with one or more frequency spectrum of a mode-locked laser source.

Figure 6A:
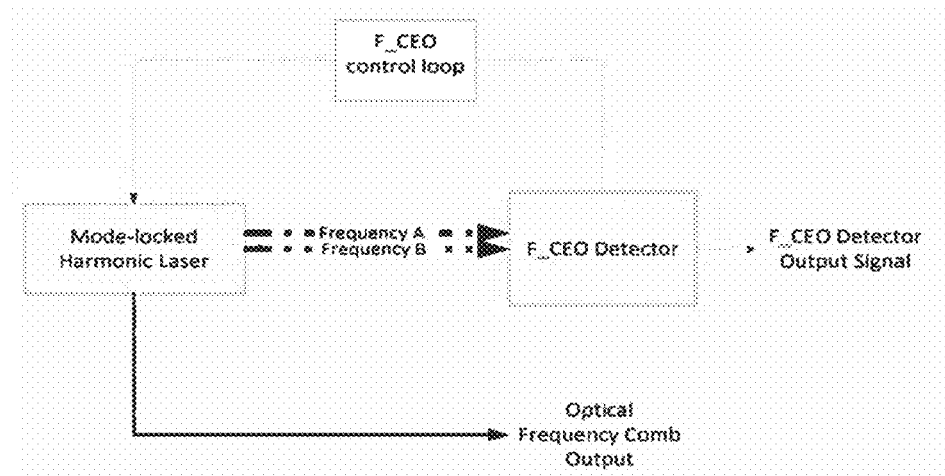
FIG. 6A provides a schematic representation of inline spectral broadening.
Figure 6B:
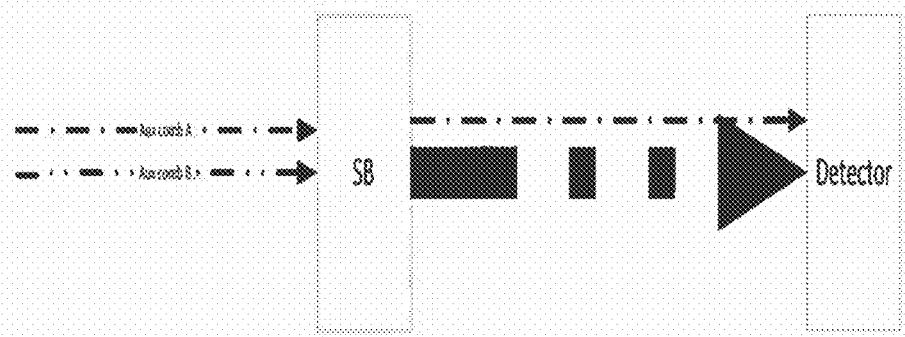
FIG. 6B provides a schematic representation of inline spectral broadening.

Extra-cavity spectral broadening could, for example as shown in FIG. 6A, broaden auxiliary frequency combs to provide sufficient spectral overlap, or as shown in FIG. 6B, selectively expand one auxiliary frequency combs to provide sufficient spectral overlap.

Figure 7:
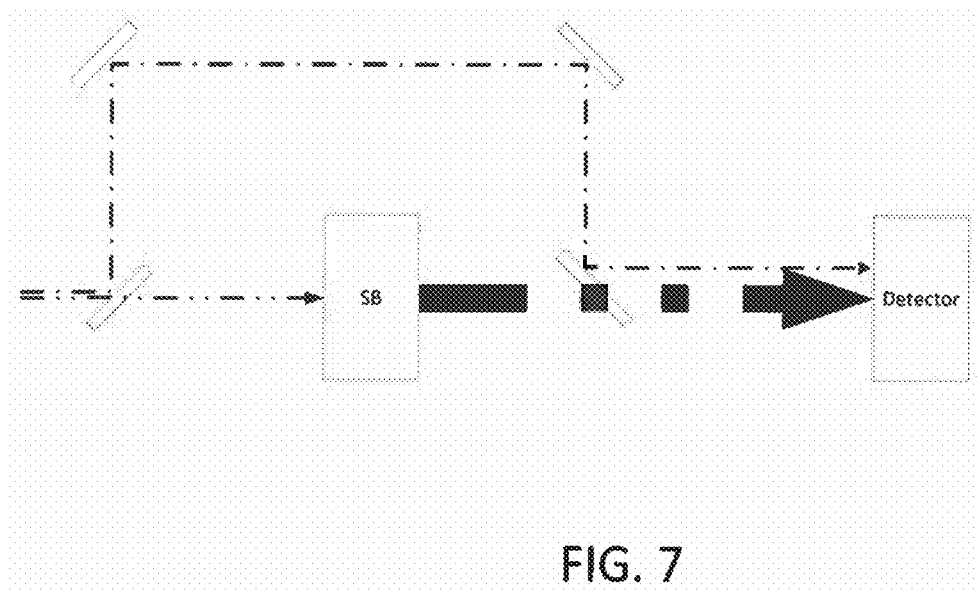
FIG. 7 provides a schematic representation of split path spectral broadening.

While it is desirable to use a single optical path with spectral broadening, the first and second auxiliary frequency combs may be isolated in separated optical paths as shown in FIG. 7, spectrally expanded and recombined for beat note detection. For example, limitations of a particular spectral broadening device such as the useable spectral bandwidth or SB dispersion limitations may require single auxiliary frequency comb broadening. In this case, if two harmonics are to be broadened, this can be achieved with 2 SB devices, one for each harmonic. Complexities of the split optical path with simplified SB may be preferred over a single path with more demanding SB requirements.

Spectral broadening and optical heterodyne performance may be enhanced with selective generation of preferred harmonics at increased output power. For example, fs oscillator cavity mirrors may be designed to be spectrally selective to enhance harmonic generation. Likewise, unused harmonics or other wavelengths that are not of interest can be suppressed.

Thus, the above stated necessary conditions for $f_{CEO}$ detection, spectral, spatial, and temporal overlaps are met with a mode-locked laser with sufficiently broad optical specta at one or more optical harmonics to provide an overlapping spectral region.

It will be appreciated the mode-locked laser is conducive to multiple harmonic output spectra, and at least a portion of one or more optical harmonics may be coupled out of the cavity in a single or multiple output beams in addition to the optical heterodyne output.

Chromatic dispersion of the laser gain medium results in significant temporal broadening of optical harmonics and in their (at least partial) overlap in time. Thus, optionally, the optical frequency comb generator can be equipped with a dispersion control component DC (combination of dispersive mirrors, combination of prisms or gratings, dispersion compensation optical fiber, dispersion compensation waveguide, etc.). In at least one embodiment, DC is installed before SB and accepts 2f and 3f optical frequency combs on its input and provides temporally superimposed 2f and 3f optical frequency combs.

Optionally, spectral filter F can be used to suppress certain spectral components and hence improve the quality of the beat note at the photodetector. For example, unwanted harmonics, residual fundamental, residual pump or other optical energy may be filtered to enhance detection of the heterodyne output.

Figure 8:
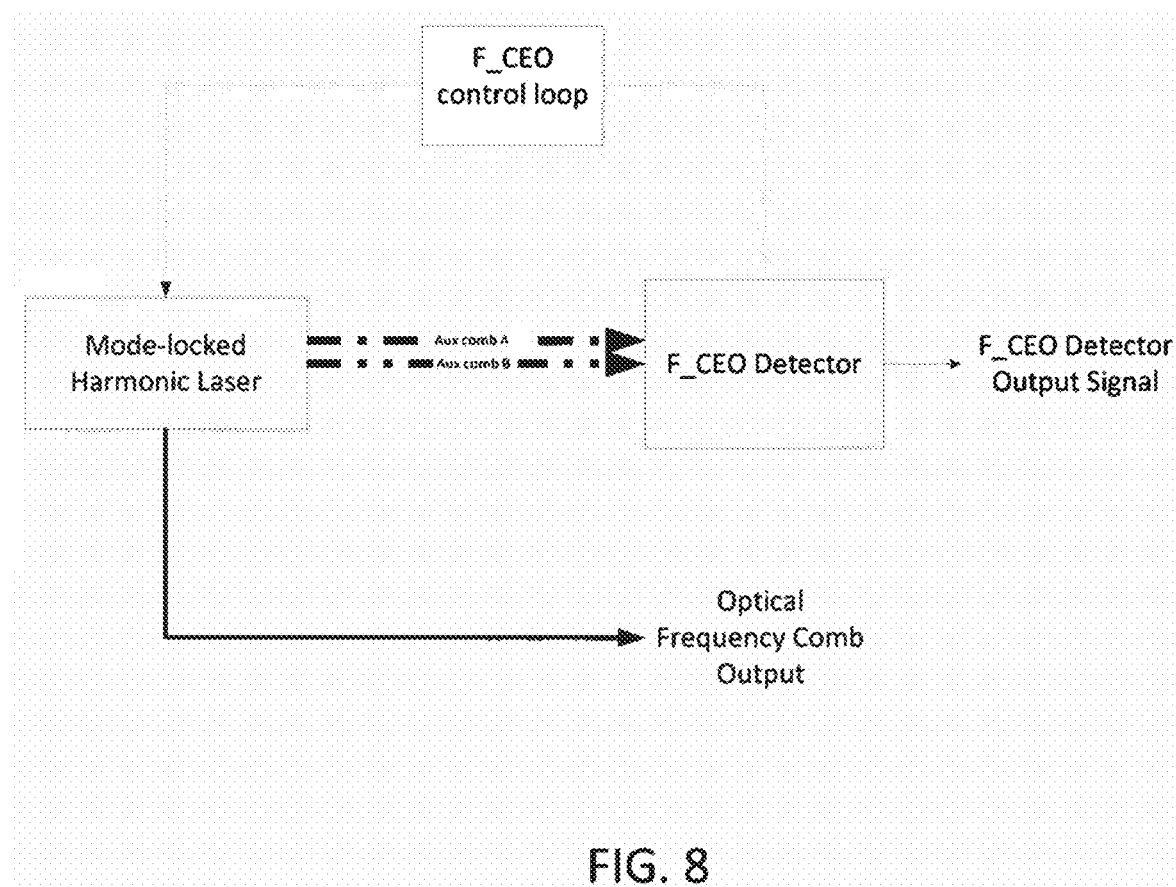
FIG. 8 provides a schematic representation of an optical frequency comb generator.

The generation of detectable optical harmonics directly in polycrystalline TM:II-VI gain medium of mid-IR fs oscillators provides a simplified alternative that avoids the use of a cumbersome nonlinear interferometer to detect the carrier envelope offset frequency $f_{CEO}$. Referring to FIG. 8, according to at least one embodiment of the present invention, a very simple and robust optical frequency comb generator uses a mode-locked laser, a self-generated heterodyne based $f_{CEO}$ detection signal, and an $f_{CEO}$ detector to generate a stabilized optical frequency comb output.

The $f_{CEO}$ detector may utilize a sufficiently sensitive and fast photodetector PD (avalanche photodiode, photomultiplier tube, etc.) to detect $f_{CEO}$ as a beat note between 2f and 3f spectral components, or other optical harmonic spectral components which are generated from the fundamental frequency comb f directly inside the gain medium of fs oscillator. The $f_{CEO}$ detector signal may be used to stabilize $f_{CEO}$ for example as is well-known with a phased-lock loop and a laser frequency control device. The stabilized $f_{CEO}$ may be set to a value. Preferably, the pump laser power is used to control laser frequency. Attenuator techniques such acousto-optic modulation and electro-optic modulation may vary the pump laser power control laser frequency and stabilize $f_{CEO}$. Other known $f_{CEO}$ stabilization techniques include for example detuning the fs oscillator by tilting a grating or other optical component.

Those skilled in the art will recognize or be able to ascertain using no more than routine experimentation many equivalents to the specific embodiments of the invention described herein. The disclosed schematics can be used with any system, but the impetus for the presently disclosed structure lies in optical frequency comb generators. It is therefore to be understood that the foregoing embodiments are presented by way of example only and that within the scope of the appended claims and equivalents thereto, the invention may be practiced otherwise than as specifically described. The present disclosure is directed to each individual feature, system, material and/or method described herein. In addition, any combination of two or more such features, systems, materials and/or methods, if such features, systems, materials and/or methods are not mutually inconsistent, is included within the scope of the present invention.

The invention claimed is:

1. An optical frequency comb generator system comprising, a femtosecond (fs) mode-locked laser oscillator simultaneously outputting:
   a first frequency comb at a first central optical frequency, and
   a least one second frequency comb at a second central optical frequency which is different from the first central frequency, wherein the first and one second frequency combs spectrally overlap one another in overlap spectral regions in which the first and second combs heterodyne beat against one another; and
   a photodetector configured to detect a heterodyne signal generated by the heterodyne beating and corresponding to a carrier envelope offset frequency.

2. The system of claim 1, wherein the fs oscillator is configured with a nonlinear laser medium simultaneously outputting the frequency combs at a fundamental central frequency and a plurality of higher harmonics of the fundamental central frequency respectively, the overlapped combs being the combs at the fundamental and second harmonic, or the second and third harmonics, or third and fourth harmonics.

3. The system of claim 2, wherein the first and second central frequencies of respective first and one second frequency combs comprise respective fundamental frequency and second harmonic thereof.

4. The system of claim 2, wherein the first and second central frequencies of respective one and second frequency combs comprise the second and third harmonics of the fundamental frequency.

5. The system of claim 1 further comprising at least one spectral broadening element operative to broaden the first and one second frequency combs, wherein the spectral broadening element is located between the fs oscillator and the carrier envelope offset frequency detector.

6. The system of claim 2, wherein the mode-locked laser is configured with a resonator cavity tailored for increased output at one or more of the higher harmonics.

7. The system of claim 2, further comprising at least one spectral filter configured to modify the spectral content of the heterodyne heating combs.

8. The system of claim 1, wherein the carrier envelope offset frequency detector is configured to provide a signal used to control the carrier envelope offset frequency and thereby stabilize the optical frequency comb output.

9. The system as in claim 1, wherein the mode-locked oscillator is a Kerr-lens mode-locked mid-JR fs oscillator that is configured with a TM:II-VI type material with high second and third order nonlinearity and a polycrystalline structure, wherein the oscillator provides three-wave mixing via a random quasi-phase matching process.

10. A method of providing an optical frequency comb comprising;
simultaneously outputting at least two overlapped optical frequency combs at respective first and second central frequencies, which are different from one another, from a mode-locked laser, wherein the first and second overlapped combs heterodyne beating against one another in overlapped spectral regions, thereby generating a heterodyne signal;
detecting the heterodyne signal; and
generating a signal corresponding to the carrier envelope offset frequency based on the detected heterodyne signal.

11. The method as in claim 10, further comprising;
providing the carrier envelope offset frequency signal to a carrier envelope offset frequency control system to stabilize the carrier envelope offset frequency.

12. A method of detecting a carrier envelope offset frequency in a Kerr lens mode-locked mid-IR polycrystalline Cr:ZnS oscillator based laser system with a self-generating harmonic output, the method comprising;
simultaneously outputting multiple optical frequency combs at respective central frequencies, which are different from one another and include a fundamental frequency and multiple higher harmonics thereof, directly in the Cr:ZnS material, at least two combs overlapping one another in overlap spectral regions, wherein the overlapped combs produce a heterodyne signal; and
detecting the heterodyne signal, and generating a signal corresponding to carrier envelope offset frequency based on the detected heterodyne signal.

* * * * *